H. G. FISKE.
Hose-Reel.

No. 199,817. Patented Jan. 29, 1878.

Witnesses:
A. J. Folsom
James H. Lewis

Inventor:
Henry G. Fiske

UNITED STATES PATENT OFFICE.

HENRY G. FISKE, OF SPRINGFIELD, MASSACHUSETTS.

IMPROVEMENT IN HOSE-REELS.

Specification forming part of Letters Patent No. 199,817, dated January 29, 1878; application filed September 10, 1877.

*To all whom it may concern:*

Be it known that I, HENRY G. FISKE, of Springfield, in the county of Hampden and State of Massachusetts, have invented a new and useful Improvement in Hose-Reels, which improvement is fully set forth in the following specification and accompanying drawing, in which—

Figure 1:
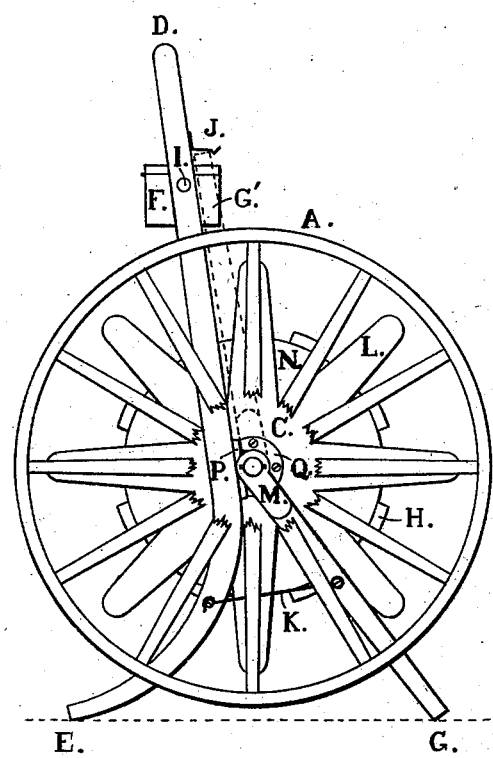
Figure 2:
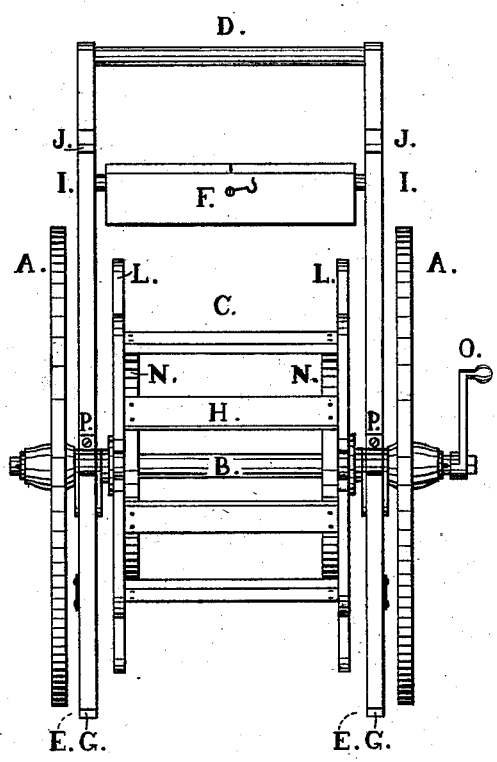

Figure 1 is a side elevation of my hose-reel standing upon its four feet, and having a section of the spokes and the hub of one of the wheels removed; Fig. 2, a front elevation, all complete.

The object of my invention is to furnish a cheap and convenient hose-reel, which can be easily worked and handle a large amount of lawn or garden hose, and move it from place to place without difficulty.

The nature of my invention consists in the construction and arrangement of a hose-reel, as will be hereinafter more fully set forth, and pointed out in the claims.

In the drawings, A indicates the wheels on which the reel is moved about from place to place. B indicates the axle, which is fitted to the wheels A, so that one wheel will revolve upon each end, and it should be of iron or some similar strong material. C indicates the reel, which is composed of the two disks N N, having a number of bars, H, fastened by their ends at regular intervals around the circumference of said disks, so that a disk shall be at each end, and thus form a sort of drum or barrel. On the ends of this are fastened a number of handles or arms, L, which form the flanges of the reel, and act to prevent the hose from falling off of the ends, and also serve as handles to work the said reel by. In the center of each disk is fastened a metal flange, one of which is shown at Q in Fig. 1. The axle passes through these flanges, and should be fastened to one or both of them, thus forming a reel, having a pivot upon each end, and upon which the wheels A turn loosely and independently.

Thus far there is substantially nothing new or novel in the arrangement or construction; but upon the same pivots or axle I suspend the upright handle D loosely by means of the two boxes shown at P. This handle is composed of a cross-bar at the top, joining two side strips, which extend downward over the ends of the reel below the axle, at which point they are bent or extended outward sufficiently far to form the feet E, which, when the handle is tipped over beyond the center of the axle in the same direction in which the feet are curved, act as a support for it, and as stops to catch into the ground, and thus prevent the wheels from moving along while the hose is being reeled on or unreeled from that side. Now, if the wheels were fastened to and formed a part of the reel, and would not turn independently of it, and this handle were applied as just described, this combination would still be old, and the feet would be of no practical use, except to keep the handle off of the ground, unless it might be that the upper part was made longer and bent over far enough, so that, if it were tipped entirely over, the two extremes—the handle and its feet—united would form a standard, upon which the reel might revolve; but by using the reel in this way it soils the handle, and, if used to reel and unreel the hose by trundling it along, it strains the hose while unreeling, and there is too much slack in reeling it up, from the fact that the drum of the reel must necessarily be smaller than the wheels which form a part of it; but by having the wheels turn independently of the reel on the same axle with it, and the handle also loosely suspended upon the same axle, and provided with the feet, one can easily manage a large amount of hose without any of these difficulties; and as the handle so suspended has none of the weight of the reel or hose upon it, it may be raised and lowered with the slightest exertion, contrary to another method, wherein the reel is suspended upon the handle, and that suspended upon the wheels, which, of course, brings a large part of the weight direct upon the hands of the person moving said reel.

It is sometimes desirable to locate the reel in a certain place, and reel up and unreel the hose while in that position from either side of the reel. To this end I add another pair of feet (shown at G) on the side opposite the feet E. This second pair of feet I suspend on the axle B by a joint, M, on each side, and fasten to the feet E by a hook, K, on each side, so as to raise the wheels and reel free from the ground, as in the drawings; and thus they form a firm standard, which has an upright handle, free to be grasped by the hand and steady the reel while turning the crank O.

The feet G may be fastened permanently down with a slight disadvantage; or they may be turned upward, and caught by the catches J on the handle D, as shown by the dotted line G'. The wheels will then rest upon the ground, and the handle may be tipped over, and used to draw or push the reel about in any direction.

It will be seen that either pair of feet E or G may be united into one, and the two pairs thus form a tripod, and still answer all purposes.

It is often desirable to carry tools, nozzles, &c., about with the reel, and a box is usually fastened to some part where it will not be liable to be turned upside down, and thus empty out its contents. Now, as the handle which I have described is the most desirable place for such a box, (shown by F,) I suspend it thereon by means of the swing-joints I, secured to the ends of said box above its center of gravity, and, so suspended, it will always retain an upright position without regard to the position of the handle when raised and lowered in the usual way.

I am aware that it is not new to mount the reel, wheels, and a frame independently upon the same straight axle; also, that arms with forwardly-projecting feet connected to the axle are known; but I am not aware that the combination herein shown and described and claimed has ever before been known.

Having thus described my invention, what I claim as new, and desire to secure by Letters Patent, is—

1. In a hose-carriage having a single straight axle, the combination of the reel, the wheels, and the upright arms, provided with forwardly-extending feet, the reel, wheel, and arms being independent of each other, and all mounted upon the axle, so as to revolve with it or on it, substantially as described.

2. In combination with an axle and wheels thereon, a hose-reel rigidly secured on the axle, the long arms having lower curved ends E E, which extend beyond the periphery of the wheels, and the legs or feet G G, hinged to the axle, and of a length to extend beyond the periphery of the wheels, and capable of being folded up to the sides of the arms, all substantially as and for the purposes herein set forth.

3. In a hose-reel, the handle D, having suspended thereon by means of the joints I I the swinging box F, the said joints being fastened to the box above its center of gravity, and thereby causing it always to retain an upright position when the handle is tipped in the usual way, substantially as shown and described.

HENRY G. FISKE.

Witnesses:
A. T. FOLSOM,
JAMES H. LEWIS.